2 Sheets--Sheet 1.

J. L. JONES.

Plug-Tobacco Machines.

No. 6,517. Reissued June 29, 1875.

Witnesses:

Geo. W. Cushing Jr.

Jos. L. Coombs

Inventor:

John L. Jones.

By James L. Norris.

Atty.

THE GRAPHIC CO. PHOTO-LITH. 39 & 41 PARK PLACE, N.Y.

2 Sheets--Sheet 2.

J. L. JONES.

Plug-Tobacco Machines.

No. 6,517. Reissued June 29, 1875.

Witnesses:

Geo. Cushing Jr.
Jos. S. Coombs

Inventor:

John L. Jones.
By James L. Norris,
Atty.

THE GRAPHIC CO. PHOTO-LITH. 39 & 41 PARK PLACE, N.Y.

UNITED STATES PATENT OFFICE.

JOHN L. JONES, OF OXFORD, NORTH CAROLINA.

IMPROVEMENT IN PLUG-TOBACCO MACHINES.

Specification forming part of Letters Patent No. 141,562, dated August 5, 1873; reissue No. 6,517, dated June 29, 1875; application filed January 21, 1875.

*To all whom it may concern:*

Be it known that I, JOHN L. JONES, of Oxford, North Carolina, have invented certain Improvements in Machines for Shaping, Pressing, and Cutting Tobacco, of which the following is a specification:

This invention has for its object to furnish a machine or apparatus for shaping, pressing, and cutting tobacco at one operation into plugs or cakes of any desired size.

The invention consists of a combination of parts, which will be fully hereinafter described, and pointed out in the claims, and, therefore, a preliminary description is deemed unnecessary.

In order to enable others skilled in the art to which my invention appertains to make and use the same, I will now proceed to describe its construction and operation, referring to the annexed drawings, in which—

Figure 1:
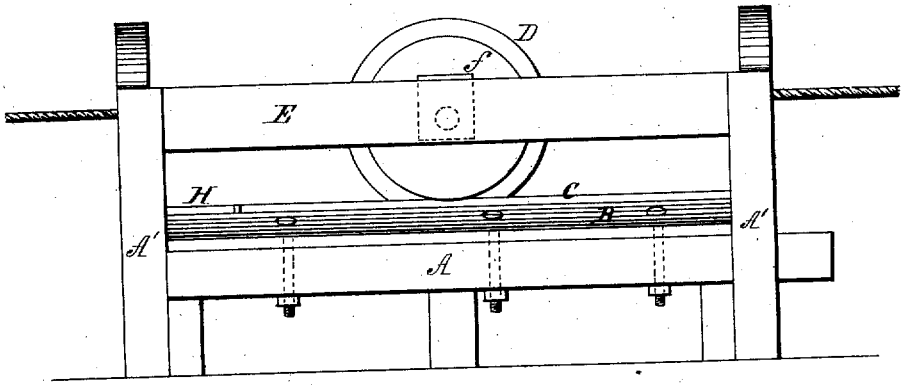
Figure 2:
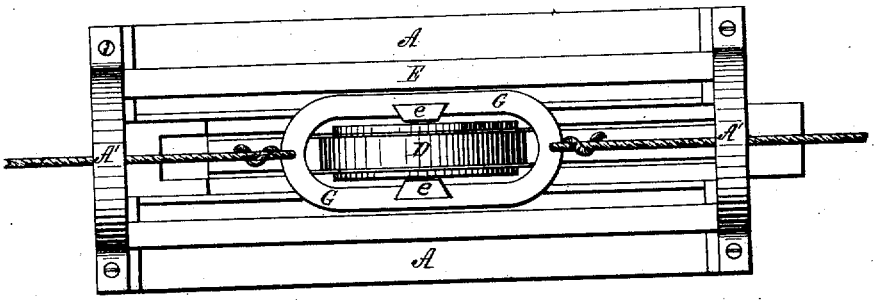
Figure 3:
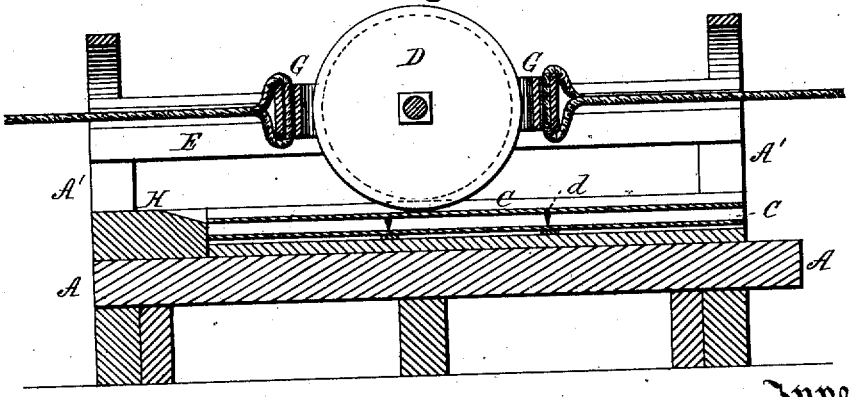
Figure 4:
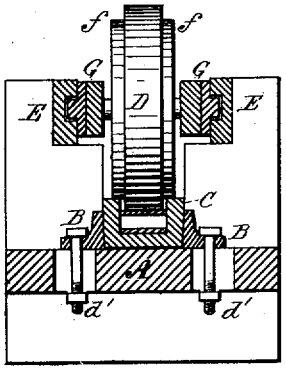
Figure 5:
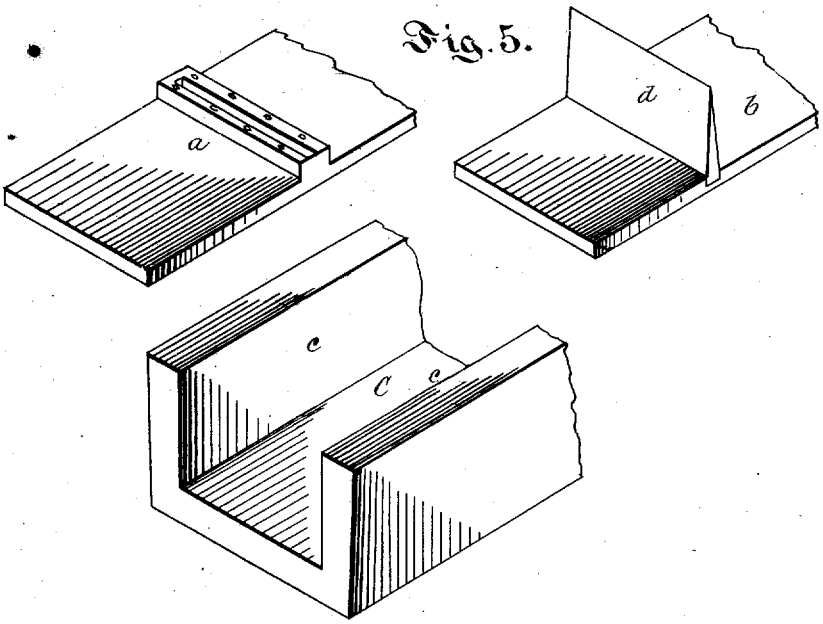

Figure 1 is a side elevation, Fig. 2 a plan view, Fig. 3 a longitudinal vertical section, and Fig. 4 a transverse vertical section, of my apparatus. Fig. 5 shows a part of the trough with its fixtures in enlarged dimensions.

A represents the bed or table of my machine, supported in a suitable frame, A′. Upon said bed are fixed two parallel guide-bars, B B, secured by bolts *d′ d′*, or otherwise, in such a manner that they may be adjusted to receive troughs or receptacles of different widths. The trough C rests upon the table or bed between these guide-bars, and is confined securely in place by them. The trough C contains a bottom, *a*, slotted or grooved transversely at regular intervals.

I have illustrated the cutting mechanism as consisting of a top or plate, *b*, provided with a series of knives, secured on its under side at distances to correspond with the said grooves, and I have shown the pressing mechanism as consisting of a wheel, D, of such width as to fit into the trough C. The journals of this wheel are placed in boxes *e e*, which slide vertically up and down in dovetailed grooves on the inside of the frame G, which latter slides in and between two parallel bars or rails, E E. The sides of the wheel D are provided with shoulders or flanges *f f* a suitable distance from the circumference, so that when the wheel enters the trough C it can only pass into the same a certain distance, or until the shoulders or flanges *f f* touch and rest upon the upper edges of the trough. At the inner end of the trough C, on the bed of the machine, is a rest or stop, H, upon which the pressing or packing wheel D runs, and remains while one trough is removed, and another placed in position.

The operation of my machine is obvious, and is as follows: The trough C, being filled with "cased" tobacco-leaves, is placed between the guides B B. The frame G, with the pressing and packing wheel D, is moved forward by means of a rope, or other suitable device, to the front end of the trough, and then back again upon the rest H. The pressure caused by the weight of the wheel shapes and packs the tobacco, and the knives D cut it into proper plugs or cakes, ready to be put through the usual process of wrapping, capping, &c.

The pressing or packing wheel D may be made of any desired weight; but I have found that one weighing from four to six hundred pounds will be sufficient for all practical purposes. If necessary, the guide-rails E may be made vertically adjustable, so that a tire or band may be put on the wheel D, in order to enlarge its size when very thin work is required.

Having thus described my invention, what I claim as new, and desire to secure by Letters Patent, is—

1. The combination of a trough, C, for receiving and holding the tobacco, a mechanism for pressing or packing the same in the trough, and a series of cutting-knives, operated by the pressing mechanism, for severing the tobacco into the desired size while under pressure, substantially as described.

2. The combination, in a machine for making plug-tobacco, of a trough, a supplemental removable bottom, *a*, therefor, a plate carrying a series of cutting-knives, and a pressing mechanism, substantially as described.

3. The combination of a trough, C, for receiving and holding the tobacco, a traveling weight for pressing the tobacco in the trough, and a series of knives operated by said weight, whereby the plug is formed, pressed, and cut simultaneously, substantially as described.

4. The combination, with the trough C, of wheel D, provided with shoulders or flanges *f f*, and arranged in vertically-movable boxes in a horizontally-moving frame or carriage, substantially as described.

In testimony that I claim the foregoing I have hereunto set my hand.

JOHN L. JONES.

Witnesses:
JAMES L. NORRIS,
JOS. L. COOMBS.